V. BENDIX.
STARTER FOR ENGINES.
APPLICATION FILED NOV. 29, 1915.
1,258,301.
Patented Mar. 5, 1918.
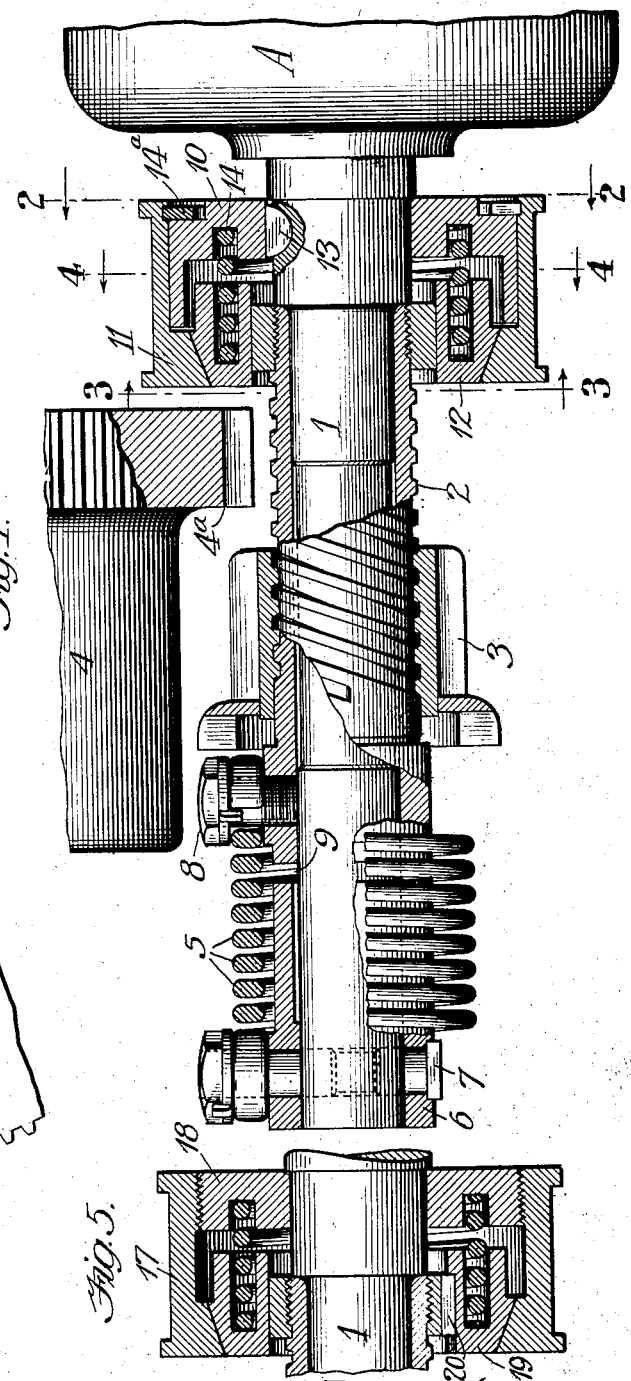
Witnesses
Martin H. Olsen.
Robert Dobberman
Inventor
Vincent Bendix
By Rector, Hibben, Davis & Macauley
His Attys.

UNITED STATES PATENT OFFICE.

VINCENT BENDIX, OF CHICAGO, ILLINOIS.

STARTER FOR ENGINES.

1,258,301.   Specification of Letters Patent.   Patented Mar. 5, 1918.

Application filed November 29, 1915. Serial No. 64,095.

*To all whom it may concern:*

Be it known that I, VINCENT BENDIX, a citizen of the United States, residing at Chicago, Cook county, Illinois, have invented certain new and useful Improvements in Starters for Engines, of which the following is a specification.

My invention relates to a starter for an engine such as a gas engine and the object thereof is to provide a simple, efficient and reliable device of this character operated by a prime mover of the motor-generator type.

My starter is of that type exemplified in general by the transmission mechanism illustrated in my Patent No. 1,125,935 issued to me on January 26, 1915. This type is characterized by the screw shaft or the like on which is mounted a pinion adapted, when such screw shaft is rotated, to travel longitudinally thereof into mesh with some rotatable member of the gas engine such as the fly wheel and to be automatically demeshed and caused to move longitudinally back to home position after the gas engine has started to operate on its own power. My transmission is operated by a motor generator set and the object of my invention is to provide a construction and arrangement of mechanism whereby when the pinion is caused to mesh with the engine member the driving connections between the engine and the motor-generator are automatically disconnected but are permitted to operate such set as a generator after the pinion has been moved back to home position.

In the drawing Figure 1 is a sectional elevation of a mechanism embodying my invention; Fig. 2 a section on the line 2—2 of Fig. 1, Figs. 3 and 4 sections on the lines 3—3 and 4—4 respectively of Fig. 1, and Fig. 5 a detail section of a modified form of construction.

In so far as the transmission mechanism of the self-starter is concerned which includes the driving shaft, screw shaft, yielding driving connection or spring and the pinion, the same is substantially as shown in my patent aforesaid, but it will be understood that my present invention is not to be limited to this specific construction but that such transmission may partake of other forms of construction, inasmuch as my present invention concerns more particularly the means whereby the driving connections between the engine and the motor-generator set are automatically controlled by the movements of the pinion of the transmission.

Referring to the present embodiment of my invention as herein shown, a driving shaft 1 of the transmission is either an extended armature shaft of the motor-generator set shown at A or is operatively connected therewith. In the present instance the shaft 1 is driven directly but it will be understood that an indirect drive between the motor-generator and the driving shaft is within the scope of my invention. The transmission also comprises a hollow screw shaft 2 mounted on the driving shaft to rotate in unison therewith and also rotarily therewith as permitted by the yielding driving connection hereinafter described. A pinion 3 is screw threaded upon the screw shaft and adapted to travel longitudinally thereon and also rotarily therewith and also adapted to coöperate with or mesh with a rotatable member of the gas engine which in this instance is the circular rack portion 4$^a$ of the fly wheel 4 of a gas engine. The yielding driving connection between the two shafts is a coiled spring 5 which is anchored at its ends to the two shafts respectively. In the present instance the outer end of the spring is not anchored directly to the driving shaft but indirectly therewith through the medium of a spring barrel 6 arranged concentric of the driving shaft and held in place at the outer end thereof by means of the pin or bolt 7 which also forms the means for anchoring the outer end of the spring. The other end of the spring is anchored to a stud or bolt 8 screwing into the outer end of the sleeve 2. The shaft and spring barrel are arranged in alinement but not in contact inasmuch as a space 9 is left between the inner end of the barrel and the outer end of the screw shaft in order that the latter may have a slight movement outwardly against the tension of the spring for the purpose explained in my patent aforesaid.

It will be understood that when the driving shaft is rotated by the motor the pinion 3 will advance longitudinally on the screw shaft and mesh with the circular rack 4$^a$ of the fly wheel and, when it has reached the extreme of its longitudinal travel, it will rotate therewith and thereby rotate the fly wheel. When the engine has started on its own power the excess speed of rotation thereof as compared with the speed of rotation of the screw shaft will automatically cause a withdrawal of the pinion from mesh with the fly wheel by longitudinal movement of the pinion on the screw shaft back to its home position.

It will be understood that the gas engine drives the motor-generator set as a generator when it (the engine) is operating on its own power. For this purpose suitable driving connections are provided between the engine and the motor-generator set and in the present instance I have shown suitable connections for this purpose, including a clutch and a drive between it and the crank shaft or other rotatable member of the engine. Referring to the specific construction herein selected the clutch consists of three main members, 10, 11 and 12, the first of which may be considered the body member, secured to the shaft 1 in suitable manner as by the key 13. The two members 11 and 12 have complementary inclined meeting faces and such faces are normally kept together by means of the coiled spring 14 bearing between the members 10 and 12. The clutch also includes a split friction ring 14ª which is located in a recess formed in the interior wall of the member 11. This latter member is the pulley member around which passes a belt 15 driven by a rotatable member of the engine such as the crank shaft 16, Fig. 2.

The spring pressed member 12 of the clutch is in the path of the movement of the pinion 3 with the result that when such pinion moves to the right (Fig. 1) in the starting operation it will contact with and move such member 12 to the right, thereby disabling that member or section and relieving the member 11 of the clutch of the pressure of the member 12 toward the left, which causes the driving engagement between the members 10 and 11. This pressure which is normally upon the member 11, causes a binding of the friction ring 14ª against the member 10 whereby the motion of the member 11 is communicated through the member 10 to the shaft 1. When, however, as just stated, the member 11 is released of that pressure the friction ring is no longer held in such frictional engagement with the member 10 and the pulley member 11 will thereupon rotate idly, that is, without communicating any motion to the shaft 1. When the engine is started on its own power and the pinion 3 is moved back to home position the clutch after being thus disabled will be restored to normal driving condition, that is, the engine will drive through the belt and clutch. It will be understood that the direction of rotation of the shaft of the motor-generator when now running as a generator is opposite to that when it was previously used as a motor and hence the continued rotation of this shaft, as a generator shaft, keeps the pinion in its normal or home position as shown in Fig. 1.

In Fig. 5 I have shown a modified form of construction of the clutch in which the pulley member 17 is secured to the inner member 18 and arranged to rotate freely on the shaft 1. The spring pressed member 19 is secured to the shaft 1 by means of the key 20 or in any other suitable manner. The operation is substantially the same as with respect to the clutch already described.

I claim:

1. A starter for engines comprising a driving member, a motor-generator operatively connected therewith for driving the same, a rotatable member driven by said driving member, an actuating member mounted on and adapted to travel longitudinally of the rotatable member and arranged to engage and drive a part of the engine to be started, in combination with driving connections operating between the engine and the motor-generator and under the control of said starter, said actuating member being separate from the driving connections but arranged to coöperate therewith.

2. A starter for engines comprising a driving member, a motor-generator operatively connected therewith for driving the same, a rotatable member driven by said driving member, an actuating member mounted on and adapted to travel longitudinally of the rotatable member and arranged to engage and drive a part of the engine to be started, in combination with driving connections operating between the engine and the motor-generator and including a clutch which is under the control of said starter, said actuating member being separate from the driving connections and arranged to conduct and operate the latter.

3. A starter for engines comprising a driving member, a motor-generator operatively connected therewith for driving the same, a rotatable member driven by said driving member, an actuating member mounted on and adapted to travel longitudinally of the rotatable member and arranged to engage and drive a part of the engine to be started, in combination with driving connections operating between the engine and the motor-generator and including a clutch which is under the control of said starter, and located adjacent said engine part, in position to be contacted by the actuating member after its engagement with such engine part.

4. A starter for engines comprising a motor-generator, a rotatable shaft driven thereby, an actuating member mounted on and adapted to automatically travel longitudinally of the shaft and arranged to engage and drive a part of the engine to be started, said member being normally in inactive position out of engagement with such engine part, driving connections operating between the engine and motor-generator and normally in driving relationship, said connections being under the control of the actuating member and being active only when such member is in inactive position.

5. A starter for engines comprising, in combination with a motor-generator, a shaft driven by the motor-generator, a screw shaft rotated by said driven shaft, a pinion screw-threaded on the screw shaft and arranged to engage and drive a part of the engine to be started, and driving connections between the engine and motor-generator and normally in condition to drive the motor-generator, said connections being under the control of the pinion and disabled thereby when the latter is in driving engagement with such engine part.

6. A starter for engines comprising a motor-generator, a rotatable member driven by the motor generator, an actuating member mounted on and adapted to travel longitudinally of the rotatable member and arranged to engage and drive a part of the engine to be started, said actuating member being normally out of engagement with said engine part, in combination with driving connections operating between the engine and the motor-generator and under the control of said starter.

7. A starter for engines comprising a motor-generator, a rotatable member driven by the motor generator, an actuating member mounted on and adapted to travel longitudinally of the rotatable member and arranged to engage and drive a part of the engine to be started, in combination with driving connections operating between the engine and the motor-generator and adapted to normally drive the motor-generator, said connections being under the control of said actuating member, said connections being in driving relationship as to the motor-generator and the engine when the latter is either stopped or running on its own power and adapted to be disabled when the actuating member is in engagement with the engine part when starting the engine.

8. A starter for engines comprising a motor-generator, a rotatable member driven by the motor generator, an actuating member mounted on and adapted to travel longitudinally of the rotatable member and arranged to engage and drive a part of the engine to be started, in combination with driving connections operating between the engine and the motor-generator and adapted to normally drive the motor-generator, said connections including a clutch which is under the control of said starter, said connections being in driving relationship as to the motor-generator and the engine when the latter is either stopped or running or its own power and adapted to be disabled when the actuating member is in engagement with the engine part when starting the engine.

9. A starter for engines comprising a motor generator, a rotatable member driven by the motor generator, an actuating member mounted on and adapted to travel longitudinally of the rotatable member and arranged to engage and drive a part of the engine to be started, in combination with driving connections operating between the engine and the motor-generator and including a clutch which is under the control of said actuating member, said connections being in driving relationship as to the motor-generator and the engine when the latter is either stopped or running on its own power and adapted to be disabled when the actuating member is in engagement with the engine part when starting the engine.

10. A starter for engines comprising a driving member, a motor-generator operatively connected therewith for driving the same, a rotatable member driven by said driving member, an actuating member mounted on and adapted to travel longitudinally of the rotatable member and arranged to engage and drive a part of the engine to be started, in combination with driving connections operating between the engine and the motor-generator and including a clutch having a movable section which is located in the path of movement of said actuating member and adapted to be moved thereby to unclutch said clutch.

11. A starter for engines comprising a screw shaft, a motor-generator operatively connected therewith for driving the same and a pinion screw threaded on said shaft and adapted to travel longitudinally thereon and arranged to engage and drive a part of the engine to be started, in combination with driving connections operating between the engine and motor-generator and under the control of said pinion, said driving connections being thereby disabled when the pinion is in its said driving engagement.

12. A starter for engines comprising a screw shaft, a motor-generator operatively connected therewith for driving the same and a pinion screw threaded on said shaft and adapted to travel longitudinally thereon and arranged to engage and drive a part of the engine to be started, in combination with driving connections operating between the engine and motor-generator and including a clutch which is under the control of said pinion and adapted to be disabled thereby when such pinion is in its said driving engagement.

13. A starter for engines comprising a screw shaft, a motor-generator operatively connected therewith for driving the same and a pinion screw threaded on said shaft and adapted to travel longitudinally thereon and arranged to engage and drive a part of the engine to be started, in combination with driving connections operating between the engine and motor-generator and including a clutch having a movable disabling section which is located in the path of movement of said pinion and adapted to be moved and disabled thereby when the pinion is in its said driving engagement.

14. A starter for engines comprising a screw shaft, a motor-generator operatively connected therewith for driving the same and a pinion screw threaded on said shaft and adapted to travel longitudinally thereon and arranged to engage and drive a part of the engine to be started, in combination with driving connections operating between the engine and motor-generator and including a clutch having a movable disabling member or section located in the path of movement of said pinion and adapted to be moved and disabled thereby when the pinion is in its said driving engagement and a second member driven from the engine by said driving connections.

15. A starter for engines comprising a screw shaft, a motor-generator operatively connected therewith for driving the same and a pinion screw-threaded on said shaft and adapted to travel longitudinally thereon and arranged to engage and drive a part of the engine to be started, in combination with driving connections operating between the engine and motor-generator and including a clutch composed of three members, namely an inner member which is located in the path of movement of said pinion and adapted to be moved and disabled thereby when the pinion is in its said driving engagement, a second member which is operatively connected with the motor generator, and a third member normally having driving engagement with the other two members and relieved therefrom by said disablement of the inner member.

16. A starter for engines comprising a screw shaft, a motor-generator operatively connected therewith for driving the same and a pinion screw threaded on said shaft and adapted to travel longitudinally thereon and arranged to engage and drive a part of the engine to be started, in combination with driving connections operating between the engine and motor-generator and including a clutch composed of three members, namely, a first member which is located in the path of movement of said pinion and adapted to be moved and disabled thereby when the pinion is in its said driving engagement, a second member operatively connected with the motor-generator, a third member adapted to be driven by the engine and normally having driving engagement with the other two members, a spring for normally holding the first and third members in driving engagement, and means arranged between the second and third members for driving purposes when the first and third members are in driving engagement.

17. A starter for engines comprising a screw shaft, a motor-generator operatively connected therewith for driving the same and a pinion screw threaded on said shaft and adapted to travel longitudinally thereon and arranged to engage and drive a part of the engine to be started, in combination with driving connections operating between the engine and motor-generator and including a clutch composed of three members, namely, a first member which is located in the path of movement of said pinion and adapted to be moved and disabled thereby when the pinion is in its said driving engagement, a second member operatively connected with the motor-generator, a third member adapted to be driven by the engine and normally having driving engagement with the other two members, a spring interposed between the first and second members for normally pressing the first and third members into driving engagement, and means arranged between the second and third members for driving purposes when the first and third members are in driving engagement.

18. A starter for engines comprising a screw shaft, a motor-generator operatively connected therewith for driving the same and a pinion screw threaded on said shaft and adapted to travel longitudinally thereon and arranged to engage and drive a part of the engine to be started, in combination with driving connections operating between the engine and motor-generator and including a clutch composed of three members, namely, a first member which is located in the path of movement of said pinion and adapted to be moved and disabled thereby when the pinion is in its said driving engagement, a second member operatively connected with the motor-generator, a third member adapted to be driven by the engine and normally having driving engagement with the other two members, a spring for normally holding the first and third members in driving engagement, and a friction ring interposed between the second and third members for driving purposes when the first and third members are in driving engagement.

19. A starter for engines comprising a screw shaft, a motor-generator operatively connected therewith for driving the same and a pinion screw threaded on said shaft and adapted to travel longitudinally thereon and arranged to engage and drive a part of the engine to be started, in combination with driving connections operating between the engine and motor-generator and including a clutch composed of three members, namely, a first member which is located in the path of movement of said pinion and adapted to be moved and disabled thereby when the pinion is in its said driving engagement, a second member operatively connected with the motor-generator, a third member adapted to be driven by the engine and normally having driving engagement with the other two members, such third member being in the form of a ring inclosing the other two members, a spring for normally holding the first and third members in driving engagement, and means arranged between the second and third members for driving purposes when the first and third members are in driving engagement.

20. A starter for engines comprising a driving member mounted for longitudinal movement for automatic engagement with a part of the engine to be started and for rotary driving movement when so engaged, said member being normally disengaged from said engine part in combination with a generator, and a normally operative driving connection between the engine and generator controlled by the driving member and adapted to be rendered inoperative by the longitudinal movement of the driving member into said engagement with the engine part.

21. A starter for engines comprising a driving pinion mounted for longitudinal movement for automatic meshing with a part of the engine to be started and for rotary driving movement when so engaged, said pinion being normally disengaged from said engine part, in combination with a generator and a normally operative driving connection between the engine and generator controlled by the driving pinion, and adapted to be rendered inoperative by the longitudinal movement of the driving pinion into said engagement with the engine part.

22. A starter for engines comprising a rotatable shaft, a pinion coöperating therewith and mounted for longitudinal movement thereof for automatic engagement with a part of the engine to be started and for rotary driving movement with the shaft when so engaged, said pinion being normally disengaged from said engine part, in combination with a generator, and a normally operative driving connection between the engine and generator controlled by the pinion and adapted to be rendered inoperative by the longitudinal movement of such pinion into said engagement with the engine part.

23. A starter for engines comprising a rotatable screw shaft, a pinion mounted thereon for longitudinal movement therewith for automatic engagement with a part of the engine to be started and for rotary driving movement therewith when so engaged, said pinion being normally disengaged from said engine part and adapted to be automatically advanced into such engagement when the shaft is rotated, in combination with a generator and a normally operative driving connection between the engine and generator controlled by the pinion and adapted to be rendered inoperative by the longitudinal movement thereof into said engagement with the engine part.

VINCENT BENDIX.

Witnesses:
S. E. HIBBEN,
ROBERT DOBBERMAN.